(12) United States Patent
Vanbesien et al.

(10) Patent No.: US 8,361,562 B2
(45) Date of Patent: Jan. 29, 2013

(54) INK COMPOSITIONS

(75) Inventors: Daryl W. Vanbesien, Burlington (CA); Edul N. Dalal, Webster, NY (US); Karen A. Moffat, Brantford (CA); Michelle N. Chretien, Mississauga (CA); Barkev Keoshkerian, Thornhill (CA); Richard P. N. Veregin, Oakville (CA); Jordan H. Wosnick, Toronto (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 468 days.

(21) Appl. No.: 12/689,333

(22) Filed: Jan. 19, 2010

(65) Prior Publication Data

US 2011/0177248 A1 Jul. 21, 2011

(51) Int. Cl.
*C09D 11/00* (2006.01)

(52) U.S. Cl. ........ 427/511; 427/469; 427/487; 427/504; 427/514; 522/71

(58) Field of Classification Search .................. 522/71; 427/469, 487, 504, 511, 514
See application file for complete search history.

(56) References Cited

U.S. PATENT DOCUMENTS

| | | | |
|---|---|---|---|
| 5,389,958 A | 2/1995 | Bui et al. | |
| 6,318,852 B1 | 11/2001 | White | |
| 7,276,614 B2 | 10/2007 | Toma et al. | |
| 7,279,587 B2 | 10/2007 | Odell et al. | |
| 7,632,546 B2 | 12/2009 | Odell et al. | |
| 7,812,064 B2 | 10/2010 | Odell et al. | |
| 2004/0255809 A1 | 12/2004 | Horie | |
| 2006/0119686 A1 | 6/2006 | Odell | |
| 2006/0158496 A1 | 7/2006 | Odell et al. | |
| 2007/0120921 A1 | 5/2007 | Carlini et al. | |
| 2007/0120924 A1 | 5/2007 | Odell et al. | |
| 2007/0142492 A1 | 6/2007 | Odell et al. | |
| 2008/0096998 A1* | 4/2008 | Oyanagi et al. | 522/49 |
| 2008/0122914 A1 | 5/2008 | Toma et al. | |
| 2010/0092736 A1 | 4/2010 | Nishikawa | |
| 2010/0215865 A1* | 8/2010 | Keoshkerian et al. | 427/511 |

FOREIGN PATENT DOCUMENTS

| | | |
|---|---|---|
| DE | 60 2006 000 182 T2 | 2/2008 |
| DE | 601 30 907 T2 | 6/2008 |
| EP | 2 161 137 A1 | 3/2010 |
| EP | 2 267 478 A2 | 12/2010 |
| EP | 2 302 011 A1 | 3/2011 |
| JP | A-2005-126507 | 5/2005 |

OTHER PUBLICATIONS

U.S. Appl. No. 12/474,946, filed May 29, 2009, Michelle N. Chretien et al.
"Dimer Acids," *Kirk-Othrner Encyclopedia of Chemical Technology*, vol. 8, 4th Ed. (1992), pp. 223 to 237.

(Continued)

*Primary Examiner* — Vu A Nguyen
(74) *Attorney, Agent, or Firm* — Oliff & Berridge, PLC

(57) ABSTRACT

A light-cyan radiation-curable gel ink including at least one curable monomer, at least one organic gellant, at least one photoinitiator, and a colorant. The colorant includes a cyan colorant, a hue-adjusting colorant that absorbs light having a wavelength of from about 500 to about 600 nm, and an optional shade-adjusting colorant that absorbs light having a wavelength of from about 400 to about 500 nm.

17 Claims, 2 Drawing Sheets

OTHER PUBLICATIONS

Nov. 23, 2011, Search Report issued in German Patent Application No. 10 2011 002 511.1 (with partial English-translation).

Search Report dated May 18, 2011 issued in Great Britain Patent Application No. GB1100905.7.

* cited by examiner

INK COMPOSITIONS

TECHNICAL FIELD

This disclosure is generally directed to curable gel inks, such as radiation-curable gel inks, and their use in forming images, such as through inkjet printing. More specifically, this disclosure is directed to light-cyan radiation-curable gel inks, methods of making such inks, and methods of forming images with such inks.

BACKGROUND

Inkjet printing systems and radiation-curable gel inks are known in the art. However, while known gel ink compositions are used successfully, a need remains for improved gel ink compositions capable of being used to develop higher quality images.

Gel ink colors typically include, for example, cyan, magenta, yellow, and black. However, gel ink compositions of lighter colors may also be desirable. Light-colored inks, in combination with the typical inks, may enable higher quality images while suppressing image quality defects such as graininess and mottle over the tone range from the low density area to the high density area.

However, obtaining effective light-colored inks is not as trivial as simply preparing an ink composition with a reduced colorant load of the conventional colorant. This is because there are significant hue differences between, for example, a low-colorant-loaded cyan ink and the full-colorant-loaded cyan ink.

As a result, there exists a need to develop radiation-curable gel inks to achieve higher quality images.

SUMMARY

The present disclosure in embodiments addresses these various needs and problems by providing a light-cyan radiation-curable gel ink comprising: at least one curable monomer, at least one organic gellant, at least one photoinitiator, and a colorant, the colorant comprising a cyan colorant, a hue-adjusting colorant that absorbs light having a wavelength of from about 500 to about 600 nm, and an optional shade-adjusting colorant that absorbs light having a wavelength of from about 400 to about 500 nm.

Embodiments also include methods for making such inks and methods of forming images with such inks.

These and other improvements are accomplished by the compositions and methods described in embodiments herein.

EMBODIMENTS

Figure 1:
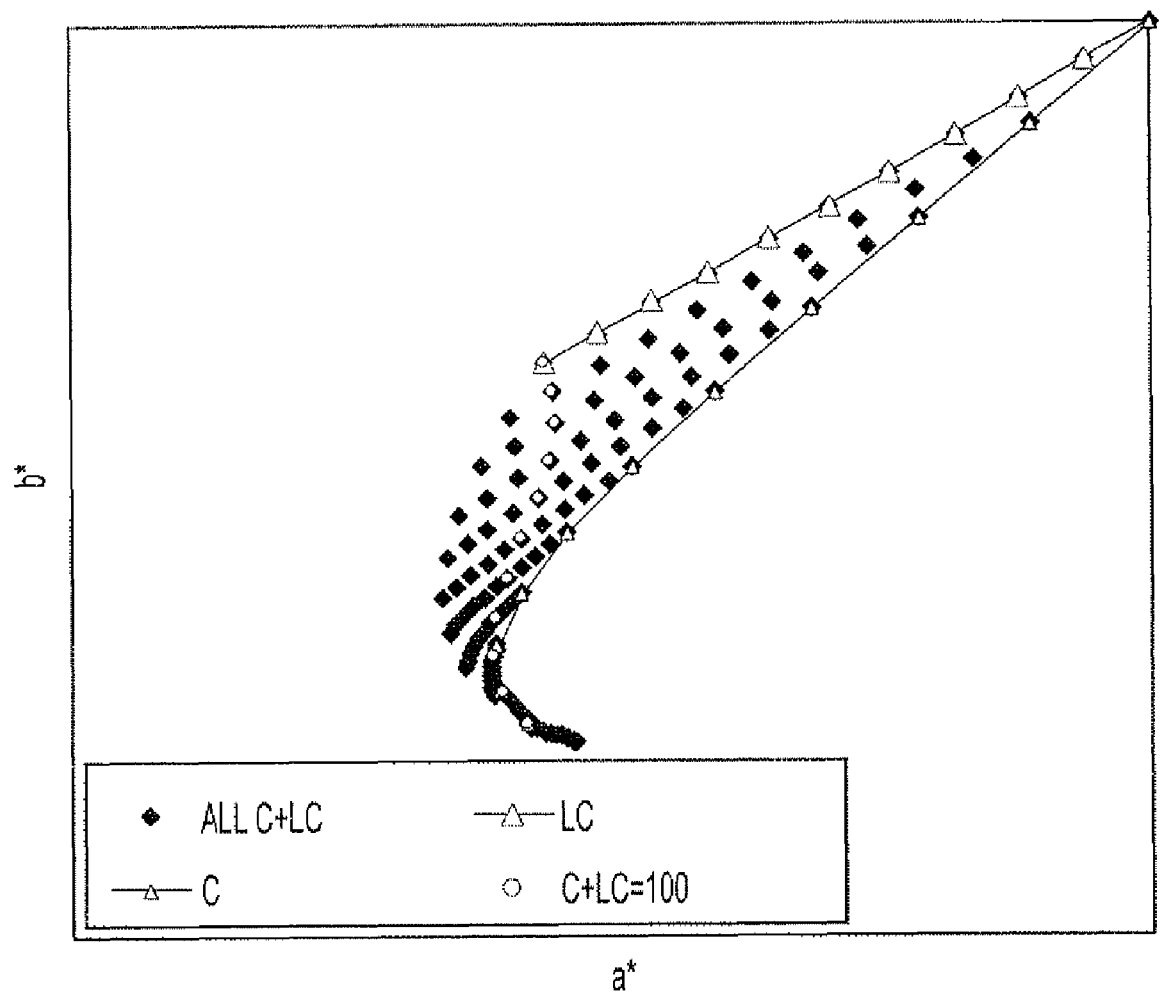
FIG. 1 is a graph of b* vs. a* illustrating the color difference between a light-cyan gel ink that is not hue corrected relative to the target halftone trajectory of the nominal cyan gel ink.

This disclosure is not limited to particular embodiments described herein, and some components and processes may be varied by one of ordinary skill, based on this disclosure.

Exemplary ink compositions provide superior print quality while meeting requirements of typical printing processes. The present disclosure provides an ink composition comprising at least one curable monomer, at least one organic gellant, at least one photoinitiator, and a colorant. In embodiments, the ink composition may include an optional curable wax. The colorant comprises a cyan colorant, a hue-adjusting colorant that absorbs wavelengths of light from about 500 to about 600 nm, and an optional shade-adjusting colorant that absorbs wavelengths of light from about 400 to about 500 nm.

Radiation-curable gel ink image forming systems typically have cyan, magenta, yellow and black inks in a four printhead system. In digital imaging, these colored inks are generally used by printing halftone dots in varying concentrations and combinations to form the desired image. While the halftone dots themselves are typically small enough that they are not visible, the texture produced by these dots is visible, and may be unacceptable for certain high quality applications, such as printing high quality photographs. In addition to objectionable halftone texture, even small levels of non-uniformity can lead to objectionable visible noise, such as graininess, mottle, etc. The objectionable visible texture and noise can be significantly reduced by the use of light-colored inks.

Image quality may be improved by adding one, two, or more additional inks to form a system with five, six, or more print heads. One color of ink that will provide immense value and increase image quality is light-cyan. Light-cyan inks can enable very high quality images and suppress image quality defects such as graininess and mottle over the tone range from a low density area to a high density area.

However, obtaining effective light-colored inks is not as trivial as simply preparing an ink composition with a reduced colorant load of the conventional colorant used in the fully loaded ink. There is a significant hue difference between a low-colorant-loaded cyan ink and the full-colorant-loaded cyan ink. This is caused by unwanted absorptions leading to color variation across the tone reproduction curve (TRC). In embodiments, the undesirable absorptions are corrected by providing a cyan ink that is shaded with additional colorants to correct for the hue shift and thereby smooth the TRC while still providing the desired light-cyan color.

Another advantage of radiation-curable inks is the reduced jetting and gelling temperatures as compared to previous, standard hot melt inkjet inks. Standard hot melt inkjet inks must be jetted at very high temperatures, whereas the presently disclosed inkjet ink compositions may exhibit gel and lower jetting temperatures. Lower gel temperatures can further facilitate smoothing or leveling of the jetted ink by the application of heat.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups and the like.

The term "short-chain" refers, for example, to hydrocarbon chains in which n represents the number of carbon atoms in the chain and wherein n is a number of from about 1 to about 7, such as from about 2 to about 5 or from about 3 to about 4.

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer capable of subjecting a sample to a steady shear strain or a small amplitude sinusoidal deformation. In this type of instrument, the shear strain is applied by the operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $\eta'' = G'/\omega$ and $i$ is $\sqrt{-1}$. Alternatively a viscometer that can measure only the transient measurement of, for instance, a capillary or shear viscosity can also be used.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

Monomers

In embodiments, the ink composition may include one or more co-monomers. The combination of the co-monomers may aid in solubilizing the gellant material. The co-monomers may be chosen from any suitable radiation-curable monomers.

In embodiments, ink compositions may comprise a first co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of curable liquid monomers, such as UV-curable liquid monomers. The gel phase of such ink compositions allows an ink droplet to be pinned to a receiving substrate.

Examples of the curable monomer of the composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. Examples of suitable radiation-curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., EBECRYL 140, EBECRYL 1140, EBECRYL 40, EBECRYL 3200, EBECRYL 3201, EBECRYL 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris(2-hydroxy ethyl) isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like.

In embodiments, the co-monomers may be chosen from short-chain alkyl glycol diacrylates or ether diacrylates, such as propoxylated neopentyl glycol diacrylate, or from acrylates having short-chain alkyl ester substituents, such as caprolactone acrylate, and the commercially available products CD536, CD 2777, CD585 and CD586 (available from Sartomer Co. Inc.).

In embodiments, the radiation-curable gel ink compositions may include one or more co-monomers in an amount ranging from about 10% to about 80% by weight of the ink such as from about 20% to about 70%, or from about 30% to about 60%.

Curable Gellants

In embodiments, the gel ink composition may include at least one optional organic gellant.

The organic gellants function to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink composition. Mixtures of one or more gellants may be used to effect the phase-change transition.

The phase change nature of the gellant may be used to cause a rapid viscosity increase in the jetted ink composition following jetting of the ink to the substrate. In particular, jetted ink droplets may be pinned into position on a receiving substrate with a cooler temperature than the ink-jetting temperature of the ink composition through the action of a phase-change transition.

In embodiments, the temperature at which the ink composition forms the gel state is any temperature below the jetting temperature of the ink composition, for example any temperature that is about 10° C. or more below the jetting temperature of the ink composition. In embodiments, the gel state may be formed at temperatures from about 20° C. to about 85° C., such as from about 30° C. to about 80° C., from about 40° C. to about 75° C., from about 45° C. to about 70° C., such as about 65° C. There is a rapid and large increase in ink viscosity upon cooling from the jetting temperature at which the ink composition is in a liquid state, to the gel transition temperature, at which the ink composition converts to the gel state. The ink composition of some embodiments may show at least a $10^{2.5}$-fold increase in viscosity.

Suitable gellants may gel the monomers/oligomers in the ink vehicle quickly and reversibly, and demonstrate a narrow phase-change transition, for example within a temperature range of about 20° C. to about 85° C. The gel state of exemplary ink compositions should exhibit a minimum of $10^{2.5}$ mPa·s, such as $10^3$ mPa·s, increase in viscosity at substrate temperatures, for instance, from about 30° C. to about 70° C., compared to the viscosity at the jetting temperature. In particular embodiments, the gellant-containing ink compositions rapidly increase in viscosity within 5° C. to 10° C. below the jetting temperature and ultimately reach a viscosity above $10^4$ times the jetting viscosity, for example about $10^5$ times the jetting viscosity.

Gellants suitable for use in the ink compositions include a curable gellant comprised of a curable amide, a curable polyamide-epoxy acrylate component and a polyamide component, a curable composite gellant comprised of a curable epoxy resin and a polyamide resin, mixtures thereof and the like, as disclosed in U.S. patent application Ser. No. 12/474,946, which is hereby incorporated herein by reference in its entirety. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as paper, can lead to an undesirable decrease in the substrate opacity. The curable gellant may also participate in the curing of monomer(s) of the composition.

Gellants suitable for use in the composition may be amphiphilic in nature to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Patent Application Publication No. 2008/0122914 and U.S. Pat. Nos. 7,276,614 and 7,279,587, the entire disclosures of which are incorporated herein by reference.

The amide gellant may be a compound of the following formula:

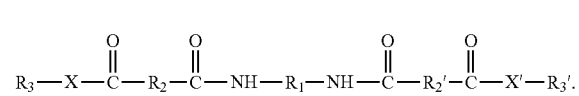

In the above formula, $R_1$ may be:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 to about 12 carbon atoms, such as from about 1 to about 8 or from about 1 to about 5;

(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 to about 15 carbon atoms, such as from about 3 to about 10 or from about 5 to about 8;

(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 to about 32 carbon atoms, such as from about 6 to about 22 or from about 6 to about 12; or (iv) an alkylarylene group (wherein an allcylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 to about 32 carbon atoms, such as from about 6 to about 22 or from about 7 to about 15, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring.

In the above formula, $R_2$ and $R_2'$ each, independently of the other, may be:

(i) alkylene groups having from about 1 to about 54 carbon atoms, such as from about 1 to about 48 or from about 1 to about 36;

(ii) arylene groups having from about 5 to about 15 carbon atoms, such as from about 5 to about 13 or from about 5 to about 10;

(iii) arylalkylene groups having from about 6 to about 32 carbon atoms, such as from about 7 to about 33 or from about 8 to about 15; or (iv) alkylarylene groups having from about 6 to about 32 carbon atoms, such as from about 6 to about 22 or from about 7 to about 15;

wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring.

In the above formula, $R_3$ and $R_3'$ each, independently of the other, may be either:

(a) photoinitiating groups, such as groups derived from 1-(4-(2-hydroxyethoxy)phenyl)-2-hydroxy-2-methylpropan-1-one, of the formula

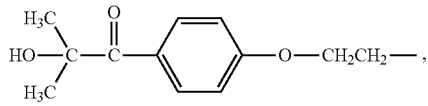

groups derived from 1-hydroxycyclohexylphenylketone, of the formula

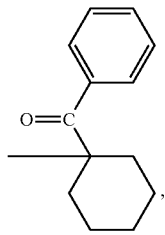

groups derived from 2-hydroxy-2-methyl-1-phenylpropan-1-one, of the formula

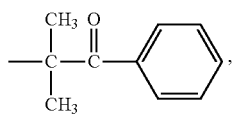

groups derived from N,N-dimethylethanolamine or N,N-dimethylethylenediamine, of the formula

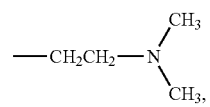

or the like; or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 to about 100 carbon atoms, such as from about 3 to about 60 or from about 4 to about 30;

(ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 to about 100 carbon atoms, such as from about 5 to about 60 or from about 6 to about 30, such as phenyl or the like;

(iii) an arylallcyl group (including substituted and unsubstituted arylallcyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylallcyl group) having from about 5 to about 100 carbon atoms, such as from about 5 to about 60 or from about 6 to about 30, such as benzyl or the like; or (iv) an alkylaryl group (including substituted and unsubstituted allcylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 to about 100 carbon atoms, such as from about 5 to about 60 or from about 6 to about 30, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

In addition, in the above formula, X and X' each, independently of the other, may be an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 to about 100 carbon atoms, such as from about 5 to about 60 or from about 6 to about 30;

(iii) an aryl group, including substituted and unsubstituted aryl groups, and wherein heteroatoms either may or may not be present in the aryl group, having from about 5 to about 100 carbon atoms, such as from about 5 to about 60 or from about 6 to about 30;

(iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 to about 100 carbon atoms, such as from about 5 to about 60 or from about 6 to about 30; or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 to about 100 carbon atoms, such as from about 5 to about 60 or from about 6 to about 30, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Further details may be found, for example, in U.S. Pat. Nos. 7,279,587 and 7,276,614.

In embodiments, the gellant may comprise a mixture comprising:

The epoxy resin component in the composite gellant may be any suitable epoxy group-containing material. In embodiments, the epoxy group containing component includes the diglycidyl ethers of either polyphenol-based epoxy resin or a polyol-based epoxy resin, or mixtures thereof. That is, in embodiments, the epoxy resin has two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin may be a dipropylene glycol-co-epichlorohydrin resin with not more than two glycidyl ether terminal groups. Suitable epoxy resins have a weight average molecular weight in the range of from about 200 to about 800, such as from about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil, and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth) acrylate, vinyl ether, allyl ether, and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid,"

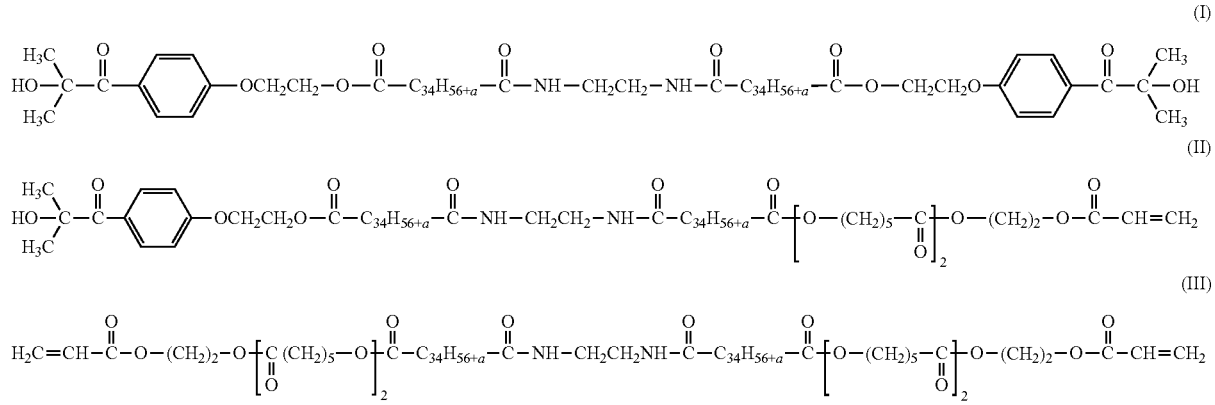

wherein —$C_{34}H_{56+a}$— represents a branched alkylene group which may include unsaturations and cyclic groups, wherein the variable "a" is an integer from 0-12.

In embodiments, the gellant may be a composite gellant, for example comprised of a curable epoxy resin and a polyamide resin. Suitable composite gellants are described in commonly assigned U.S. Patent Application Publication No. 2007/0120921, the entire disclosure of which is incorporated herein by reference.

prepared from dimerized C-18 unsaturated acid feedstocks such as oleic acid, linoleic acid, and the like, and a polyamine, such as a diamine (for example, alkylenediamines such as ethylenediamine, DYTEK series diamines, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795, and VERSAMID 963, all of which have low molecular weights and low amine numbers. The SYLVAGEL polyamide resins from Arizona Chemical Company, and variants thereof including polyether-polyamide resins may be employed. The composition of the SYLVAGEL resins obtained from Arizona Chemical Company are described as polyalkyleneoxydiamine polyamides with the general formula,

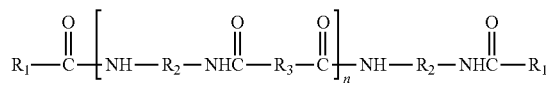

wherein $R_1$ is an alkyl group having at least seventeen carbons, $R_2$ includes a polyalkyleneoxide, $R_3$ includes a C-6 carbocyclic group, and n is an integer of at least 1.

The gellant may also comprise a curable polyamide-epoxy acrylate component and a polyamide component, such as disclosed, for example, in commonly assigned U.S. Patent Application Publication No. 2007/0120924, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation-curable via free-radical initiation and enable chemical bonding of the gellant to the cured ink vehicle. A commercially available polyamide-epoxy acrylate is PHOTOMER RM370 from Cognis. The curable polyamide-epoxy acrylate may also be selected from within the structures described above for the curable composite gellant comprised of a curable epoxy resin and a polyamide resin.

The ink composition may include the gellant in any suitable amount, such as about 1% to about 50% by weight of the composition. In embodiments, the gellant may be present in an amount of about 2% to about 20% by weight of the composition, such as about 3% to about 10% by weight of the composition.

Curable Waxes

The ink composition may optionally include at least one curable wax. The wax may be a solid at room temperature (25° C.). Inclusion of the wax may promote an increase in viscosity of the ink composition as the composition cools from the application temperature. Thus, the wax may also assist the gellant in avoiding bleeding of the composition through the substrate.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group. The curable waxes described herein may be cured with the above curable monomer(s).

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550, and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL 2033. For example, C-36 dimer diol mixtures may be used, including isomers of the formula

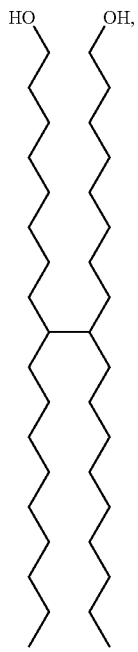 [SMILES: CCCCCCCCCC(CCCCCCCCO)C(CCCCCCCCC)CCCCCCCCO]

as well as other branched isomers that may include unsaturations and cyclic groups, available from Uniqema, New Castle, Del. Further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3-(CH_2)_n-COOН$, where there is a mixture of chain lengths, n, where the average chain length is about 16 to about 50, and linear low molecular weight polyethylene, of similar average chain length. Suitable examples of such waxes include, but are not limited to, UNICID 350, UNICID 425, UNICID 550 and UNICID 700 with $M_n$ equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL 1009. For example, C-36 dimer acid mixtures may also be used, including isomers of the formula

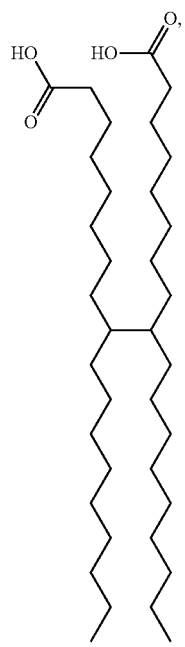 [SMILES: CCCCCCCCCC(CCCCCCCC(=O)O)C(CCCCCCCCC)CCCCCCCC(=O)O]

as well as other branched isomers that may include unsaturations and cyclic groups, available from Uniqema, New Castle, Del. Further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223 to 237. These carboxylic acids can be reacted with alcohols equipped with UV curable moieties to form reactive esters. Examples of these alcohols include, but are not limited to, 2-allyloxyethanol from Sigma-Aldrich Co.;

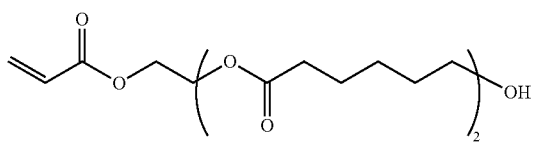

SR495B from Sartomer Company, Inc.;

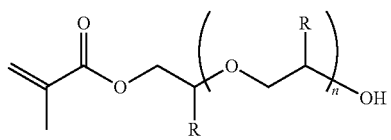

CD572 (R=H, n=10) and SR604 (R=Me, n=4) from Sartomer Company, Inc.

The curable wax can be included in the composition in an amount of from, for example, about 0.1% to about 30% by weight of the composition, such as from about 0.5% to about 20% or from about 0.5% to 15%.

Initiators

The radiation-curable gel ink may optionally include an initiator, such as, for example, a photoinitiator. In embodiments, such an initiator is desirable for assisting in curing of the ink.

In embodiments, a photoinitiator that absorbs radiation, for example UV light radiation, to initiate curing of the curable components of the ink may be used. Ink compositions containing acrylate groups or inks comprised of polyamides may include photoinitiators such as benzophenones, benzoin ethers, benzil ketals, α-hydroxyalkylphenones, α-alkoxyalkylphenones α-aminoallcylphenones and acylphosphine photoinitiators sold under the trade designations of IRGACURE and DAROCUR. from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl)phosphine oxide; 2,4,6-trimethylbenzoylphenylphosphinic acid ethyl ester; oligo(2-hydroxy-2-methy-1-(4-(1-methylvinyl)phenyl)propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

In embodiments, the photoinitiator may absorb radiation of about 200 to about 420 nm wavelengths in order to initiate cure, although use of initiators that absorb at longer wavelengths, such as the titanocenes that may absorb up to 560 nm, may also be used without restriction.

The total amount of initiator included in the ink composition may be from, for example, about 0.5 to about 15% by weight of the ink composition, such as from about 1 to about 10%.

Colorants

In embodiments, the light-cyan radiation-curable gel ink includes at least one colorant or a mixture of two or more colorants. As used herein the term "colorant" includes pigments, dyes, mixtures of dyes, mixtures of pigments, mixtures of dyes and pigments, and the like.

In embodiments, "light-cyan" inks may be produced that are lighter (i.e., they have a higher lightness or CIE (Commission International de l'Eclairage) L* value) than a conventional cyan ink. If the light ink is made simply by reducing the colorant concentration below that used in the corresponding conventional fully loaded ink, then the color of the light ink generally is significantly shifted relative to that of the conventional ink when halftoned to the same lightness. This can lead to objectionable color discontinuities when transitioning from the light ink to the conventional ink. In embodiments, by proper selection of combinations of colorants utilized in the composition of these light inks, it is possible to compensate for the above-mentioned undesirable color shift, such that the transition from the light ink to the conventional ink occurs smoothly and is not objectionable.

Measurement of the color may, for example, be characterized by CIE specifications, commonly referred to as CIE, L*, a*, b*; where L*, a*, and b* are the modified opponent color coordinates, which form a 3 dimensional space, with L* characterizing the lightness of a color, a* approximately characterizing the redness, and b* approximately characterizing the yellowness of a color. The pigment concentration should be chosen so that lightness (L*) corresponds with the desired ink mass on the substrate. All of these parameters may be measured with any industry standard spectrophotometer including those obtained, for example, from X-Rite Corporation. Color differences may be quantified as deltaE, or the color difference between a sample color and a reference color. DeltaE may be calculated by any acceptable formula known in the art, for example, by using the CIE DE2000 formula. The L*, a*, b* data required for determining DE2000 may be calculated, for example, under D50 illuminant and 2° observer, using Reflectance spectra which may be measured with a spectrophotometer, for example, a GretagMacbeth Spectrolino spectrophotometer.

In light-cyan gel ink compositions, the target color for the light inks may be selected to substantially match or substantially be the same as the color of a nominal cyan gel ink when printed at any one halftone area coverage value of from about 15% to about 70% halftone area coverage, such as from about 30% to about 50%, or about 40% halftone area coverage, depending on the image quality requirements and system performance. Thus, the light-cyan gel inks (at 100% solid) have a lightness L* of about 10 to about 45 units above that of the nominal cyan gel ink (at 100% solid), such as about 20 to about 35 units above that of the nominal cyan gel ink (at 100% solid). The color of the light-cyan gel inks substantially match that of the corresponding halftoned nominal cyan gel ink. Colors are "substantially" the same when the colors have a DE2000 color difference of less than about 5, such as less than about 3, or less than about 1. Thus, a light-cyan ink may include, for example, inks having a lighter color compared to the conventional cyan color, which, in embodiments, may have a lightness from about 120% to about 200% that of the conventional cyan ink, in other embodiments from about 140% to about 170% that of the conventional cyan ink. Thus, in embodiments the light-cyan inks achieve the above L* values and match the color of a particular halftoned tint of the conventional cyan ink In embodiments, light-cyan inks may be produced by combining a cyan colorant with a hue-adjusting colorant and an optional shade-adjusting colorant. Each of the cyan, hue-adjusting, and shade-adjusting colorants may be a single colorant or a combination of colorants, although the cyan, hue-adjusting, and shade-adjusting colorants are different from each other.

In embodiments, the light-cyan inks disclosed herein may contain any suitable cyan colorant. Cyan colorants include a colorant or combination of colorants that absorb wavelengths of light from about 600 to about 700 nm. More specifically, cyan colorants with a significant absorption of light in the wavelength range from about 600 to about 700 nm may be used. "Significant absorption" in embodiments encompasses absorption which is at least about 80% of the peak absorption in the visible range. Cyan colorants may include colorants such as Pigment Blue 15:3, Pigment Blue 15:4, Pigment Blue 16, Solvent Blue 35, Solvent Blue 38, Solvent Blue 48, Solvent Blue 70, Solvent Blue 101, and combinations thereof. The cyan colorant may be present in an amount of from about 0.05 percent by weight to about 6 percent by weight of the ink, or from about 0.2 percent by weight to about 1.5 percent by weight of the ink.

In embodiments, hue-adjusting colorants for a light-cyan ink may include a colorant or combination of colorants that absorb wavelengths of light from about 500 to about 600 mm More specifically, hue-adjusting colorants with a significant absorption of light in the wavelength range from about 500 to about 600 nm may be used. Examples include blue and magenta colorants such as Pigment Blue 61, Pigment Red 57:1, Pigment Red 81:2, Pigment Red 122, Pigment Red 184, Pigment Red 185, Pigment Red 238, Pigment Red 269, Solvent Red 49, Solvent Red 52, Solvent Red 151, Solvent Red 155, Solvent Red 172, Solvent Violet 13, Solvent Blue 97, Solvent Blue 102, Solvent Blue 104, Solvent Blue 128, and combinations thereof. The hue-adjusting colorant may be present in an amount of from about 0.001 percent by weight to about 1 percent by weight of the ink, or from about 0.04 percent by weight to about 0.2 percent by weight of the ink.

In embodiments, shade-adjusting colorants for a light-cyan ink may include a colorant or combination of colorants that absorb wavelengths of light from about 400 to about 500 nm. More specifically, shade-adjusting colorants with a significant absorption of light in the wavelength range from about 400 to about 500 nm may be used. Examples include yellow, orange, red, and black colorants such as Pigment Yellow 12, Pigment Yellow 17, Pigment Yellow 74, Pigment Yellow 83, Pigment Yellow 97, Pigment Yellow 139, Pigment Yellow 155, Pigment Yellow 180, Pigment Orange 2, Pigment Orange 5, Pigment Orange 38, Pigment Orange 64, Pigment Red 4, Pigment Red 38, Pigment Red 66, Pigment Red 119, Pigment Red 178, Carbon Black, Solvent Yellow 16, Solvent Yellow 93, Solvent Yellow 104, Solvent Yellow 163, Solvent Yellow 141, Solvent Red 111, Solvent Black 7, Solvent Black 27, Solvent Black 45, Cabot Mogul E black, and combinations thereof. The shade-adjusting colorant may be present in an amount of from about 0.001 percent by weight to about 0.6 percent by weight of the ink, or from about 0.003 percent by weight to about 0.05 percent by weight of the ink.

In embodiments, the total colorant may comprise from about 0.1 weight percent to about 10 weight percent of the ink, such as from about 0.2 weight percent to about 5 weight percent of the ink.

Colorants suitable for use herein include pigment particles having an average particle size of from about 15 nm to about 500 nm, such as from about 50 nm to about 200 nm in volume average diameter.

Additional Additives

The ink vehicles of embodiments may be mixtures of curable components and, optionally, additional materials including curable solids, antioxidants, as well as any conventional optional additives. Such conventional additives may include, for example, defoamers, slip and leveling agents, pigment dispersants, surfactants, optical brighteners, thixotropic agents, dewetting agents, slip agents, foaming agents, anti-foaming agents, flow agents, waxes, oils, plasticizers, binders, electrical conductive agents, fungicides, bactericides, organic and/or inorganic filler particles, leveling agents, opacifiers, antistatic agents, and the like. The inks may also include additional monomeric, oligomeric, or polymeric materials as desired.

CURABLE SOLIDS. Curable solids for use in the radiation-curable compositions include radiation-curable materials that are solids at room temperature and have one or more unsaturated functional groups therein, such as one or more alkene, alkyne, acrylate or methacrylate reactive groups. In embodiments the curable solids are low molecular weight curable solids. As used herein, the term low molecular weight refers to compounds having a weight average molecular weight of about 500 Daltons or less, such as about 150 to about 450 Daltons or from about 200 to about 400 Daltons.

In embodiments, the curable solid is an alkyl acrylate, aryl acrylate, alkylaryl acrylate, aryl alkyl acrylate, alkyl methacrylate, aryl methacrylate, alkylaryl methacrylate, aryl alkyl methacrylate.

The curable solid may be present in any effective amount of the curable inkjet ink compositions, such as, for example, from about 25 wt % to about 75 wt %, or from about 30 wt % to about 70 wt %, such as from about 40 wt % to about 70 wt %, such as from about 40 wt % to about 65 wt % or such as from about 60 wt % to about 65 wt %, of the overall weight of the ink.

ANTIOXIDANTS. The radiation-curable gel ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD 524, NAUGARD 635, NAUGARD A, NAUGARD I-403, and NAUGARD 959, commercially available from Crompton Corporation, Middlebury, Conn.; IRGANOX 1010, and IRGASTAB UV 10, commercially available from Ciba Specialty Chemicals; GENORAD 16 and GENORAD 40 commercially available from Rahn AG, Zurich, Switzerland, and the like.

When present, the optional antioxidant is present in the ink compositions of embodiments in any desired or effective amount, such as at least about 0.01% by weight of the ink composition, at least about 0.1% by weight of the ink composition, or at least about 1% by weight of the ink composition.

Ink Preparation

In embodiments, the radiation-curable gel inks may be prepared by any suitable technique. For example, the inks may be prepared by mixing the initiator, monomer, optional gellant, and the curable wax; and heating the mixture to obtain a single phase with low viscosity. Thereafter the hot mixture is slowly added to a heated colorant (i.e. pigment) dispersion (which may be a concentrate) while agitating the mixture. The ink composition may then be filtered, optionally at an elevated temperature, through a filter to remove extraneous particles.

The method of preparation for the ink compositions may be modified so as to accommodate the type of reactive gelling agents used for the preparation of the ink compositions. For example, a concentrate of the gelling agent may be prepared in one of the components of the ink composition prior to the addition of the other components. Solutions containing co-gelling agents can also be prepared by a method similar to the one described above. Further examples of ink preparation methods are set forth in the Examples below.

In embodiments, the ink compositions may have gelling temperatures of from about 30° C. to about 75° C., such as from about 30° C. to about 70° C., from about 35° C. to about 70° C., from about 45° C. to about 70° C., such as about 65° C. In particular, the ink composition is a gel at room temperature.

In embodiments, when the ink composition is in the gel state, the viscosity of the ink composition is at least about 1,000 mPa·s, such as at least about 10,000 mPa·s, or at least about 100,000 mPa·s. The viscosity values in the gel state of exemplary ink compositions may be in the range of from about $10^3$ to about $10^9$ mPa·s, such as from about $10^{4.5}$ to about $10^{6.5}$ mPa·s. Gel-phase viscosity of embodiments can vary with the print process. For example, the highest viscosities may be suitable for use in exemplary embodiments that employ intermediate transfer, or when jetting directly to porous paper in order to minimize the effects of ink bleed and feathering. On the other hand, less porous substrates, such as plastic, may require lower viscosities that control dot gain and agglomeration of individual ink pixels. The gel viscosity can be controlled by ink composition and substrate temperature. An additional benefit of the gel state for radiation-curable gellant-containing ink compositions is that higher viscosities of about $10^3$-$10^4$ mPa·s can reduce oxygen diffusion, which in turn leads to a faster rate of cure in free-radical initiation.

When the ink composition is at jetting temperature, the ink composition has a viscosity of less than about 15 mPa·s, such as less than about 12 mPa·s, from about 3 to about 12 mPa·s, or from about 5 to about 10 mPa·s. In particular embodiments, the ink compositions are jetted at temperatures of less than about 100° C., such as from about 40° C. to about 100° C., or from about 55° C. to about 90° C., less than about 80° C., such as from about 60° C. to about 80° C., such as about 70° C.

In embodiments, the light-cyan gel ink when printed on paper has a mass of from about 0.1 to about 1.5 mg/cm$^2$, such as about 0.4 to about 0.7 mg/cm$^2$.

The gel ink may contain any combination of elements, as long as it meets physical properties encompassed by this disclosure.

Image Forming and Inkjet Devices

Gel inkjet printing process and apparatuses are well known in the art and may include either direct or indirect image formation.

Printed images may be generated with the ink described herein by incorporating the ink into an inkjet device, such as a thermal inkjet device, an acoustic inkjet device, or a piezoelectric inkjet device, and concurrently causing droplets of molten ink to be ejected in an imagewise manner onto a substrate. In embodiments, the ink may be heated to a jetting temperature, for instance, above the gel-transition temperature of the ink composition.

In embodiments, the substrate may be at any suitable temperature during recording. The recording substrate may be at room temperature. However, in some embodiments, the substrate may be heated or cooled to have a surface temperature that is, for example, within the range of gel-phase transition temperatures for the ink composition. For example, the substrate may be maintained at a temperature of from about 5° C. to about 160° C., such as from about 15° C. to about 50° C., or from about 20° C. to about 40° C. In this way, the jetted ink may be made to rapidly form a gel.

The ink is typically included in at least one reservoir connected by any suitable feeding device to the ejecting channels and orifices of the inkjet head. In the jetting procedure, the inkjet head may be heated, by any suitable method, to the jetting temperature of the inks. The ink reservoir(s) may also include heating elements to heat the ink. The UV inks are thus transformed from the gel state to a molten state for jetting. "At least one" or "one or more," as used to describe components of the inkjet device, such as the ejecting channels, orifices, etc., refers to from 1 to about 2 million, such as from about 1000 to about 1.5 million or about 10,000 to about 1 million of any such component found in the inkjet device. "At least one" or "one or more" as used to describe other components of the inkjet device such as the inkjet head, reservoir, feeder, etc., refers to from 1 to about 15, such as from 1 to about 8 or from 1 to about 4 of any such component found in the inkjet device.

The inks may also be employed in indirect (offset) printing ink jet applications, where droplets of the melted ink are ejected in an imagewise manner onto an intermediate transfer member and the ink in the imagewise pattern is subsequently transferred from the intermediate transfer member to a final recording substrate. An exemplary offset or indirect printing process is also disclosed in U.S. Pat. No. 5,389,958, the disclosure of which is incorporated herein by reference.

The intermediate-transfer member may take any suitable form, such as a drum or belt. The member surface may be at room temperature or may be heated to have a surface temperature, for example, within the gel-state temperature range for the ink composition. For example, the surface may be maintained at a temperature of about 25° C. to about 100° C., such as from about 30° C. to about 70° C., or from about 30° C. to about 50° C. In this way, the jetted ink may be made to rapidly form a gel, which gel is maintained on the surface of the transfer member until transfer to the image-receiving substrate. Thus, the ink may be heated to a jetting temperature, for instance, above the gel-transition temperature of the ink composition and then heated to a second temperature at which the gel forms that is less than the first temperature.

Once upon the intermediate-transfer member surface, the jetted ink may be exposed to a limited extent of radiation so as to effect a limited curing of the ink upon the intermediate-transfer member surface. This intermediate curing does not fully cure the ink, but merely assists in setting the jetted ink so that it may be transferred to the image receiving substrate with the appropriate amount of penetration, which requires the ink droplets to have a certain rheology before transfer. For controlling the extent of the curing if an intermediate cure is practiced, reference is made to co-pending Application Publication Nos. 2006/0158496 and 2006/0119686, each incorporated herein by reference. This intermediate-curing step is not necessary in embodiments in which the gel state is sufficient to impart the desired rheology to the ink droplets.

Following jetting to the intermediate-transfer member and optional intermediate curing thereon, the ink composition is then transferred to a suitable substrate.

The ink can be jetted or transferred onto any suitable substrate or recording sheet to form an image including plain papers such as XEROX 4200 papers, XEROX Image Series papers, Courtland 4024 DP paper, ruled notebook paper, bond paper, and the like; silica coated papers such as Sharp Company silica coated paper, JuJo paper, HAMMERMILL LASERPRINT paper, and the like; glossy coated papers such as XEROX Digital Color Gloss, Sappi Warren Papers LUSTROGLOSS, and the like; transparency materials; fabrics; textile products; plastics; polymeric films; inorganic substrates such as metals, ceramics, and wood; and the like.

Following transfer to the substrate or jetting to the substrate if direct printing is employed, the ink is cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur from about 0.05 to about 10 seconds, such as from about 0.2 to about 2 seconds. The exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms$^{-1}$ would require 1 second for a point on an image to pass under a single unit, while a belt speed 4.0 ms$^{-1}$ would require 0.2 seconds to pass under four bulb assemblies.

In embodiments, the energy source used to initiate crosslinking of the radiation-curable components of the composition may be actinic, such as radiation having a wavelength in the ultraviolet or visible region of the spectrum; accelerated particles, such as electron beam radiation; thermal, such as heat or infrared radiation; or the like. Actinic radiation provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered or focused, if desired or necessary.

The curable components of the ink composition react to form a cured or cross-linked network of appropriate hardness and robustness. In embodiments, the curing is substantially complete to complete, i.e., at least 75% of the curable components are cured (reacted and/or cross-linked). This allows the ink composition to be substantially hardened and much more scratch resistant, and also adequately controls the amount of show-through on the substrate.

The following examples of radiation-curable gel ink compositions further illustrate the foregoing embodiments. These Examples are illustrative of different compositions and conditions that can be utilized in practicing the disclosure. It will be apparent, however, that the disclosure can be practiced with many types of compositions and can have many different uses in accordance with the disclosure above.

EXAMPLES

Example 1

Preparation of Ink Base

The components in Table 1 (below) are mixed at 90° C. for 1 hour.

TABLE 1

LIGHT-CYAN RADIATION-CURABLE GEL INK COMPOSITION

| Component | Amount g | and wt. % |
|---|---|---|
| Curable amide gellant | 7.5 g | 7.5% |
| UNILIN 350-acrylate | 5 g | 5% |
| IRGACURE 379 (Ciba Specialty Chemicals Inc.) | 3 g | 3% |
| IRGACURE 819 | 1 g | 1% |
| IRGACURE 127 | 3.5 g | 3.5% |
| DAROCUR ITX | 2 g | 2% |
| IRGACURE UV10 | 0.2 g | 0.2% |
| SR399LV (Sartomer Company, Inc.) | 5 g | 5% |
| SR9003 (Sartomer Company, Inc.) | 52.8 g | 52.8% |
| Pigment dispersion including X wt % of total colorant (Varies as in Table 2) | 20 g | 20% |

The amide gellant is a 1:2:1 mixture of compounds I:II:III, described in paragraph [0046] above. The ink base is filtered to 0.45 μm.

Example 2

Preparation of Gel Ink

The filtered ink base of Example 1 is added to a colorant mixture as shown in Table 2 (below) along with additional SR9003, as required to make-up the mass balance, while stirring at 90° C. The resulting ink is stirred at 90° C. for 2 h, before filtration to 1 μm.

In Examples 3-5, the processes outlined in Examples 1-2 are carried out, with each of the respective examples using a different colorant composition as outlined in Table 2 (below). Standard printing methods are used to prepare images using the light-cyan gel inks.

TABLE 2

COLORANT COMPOSITIONS

| Ink ID | Pigment Type | Pigment Loading (wt %) |
|---|---|---|
| Uncorrected | PB15:3 | 0.34 |
| A | PB15:3/PB61/R330 | 0.25/0.06/0.01 |
| B | PB15:3/PR122/PR269/R330 | 0.35/0.03/0.03/0.005 |

Example 3

Uncorrected Colorant

The processes outlined in Examples 1-2 are carried out with a reduced pigment load to produce a light-cyan gel ink. The uncorrected light-cyan contains 0.34 wt % Pigment Blue 15:3. When the resultant gel ink is used in printing, the image has a significantly large hue shift between the nominal and uncorrected light-cyan inks, easily detectable to the human eye.

Figure 2:
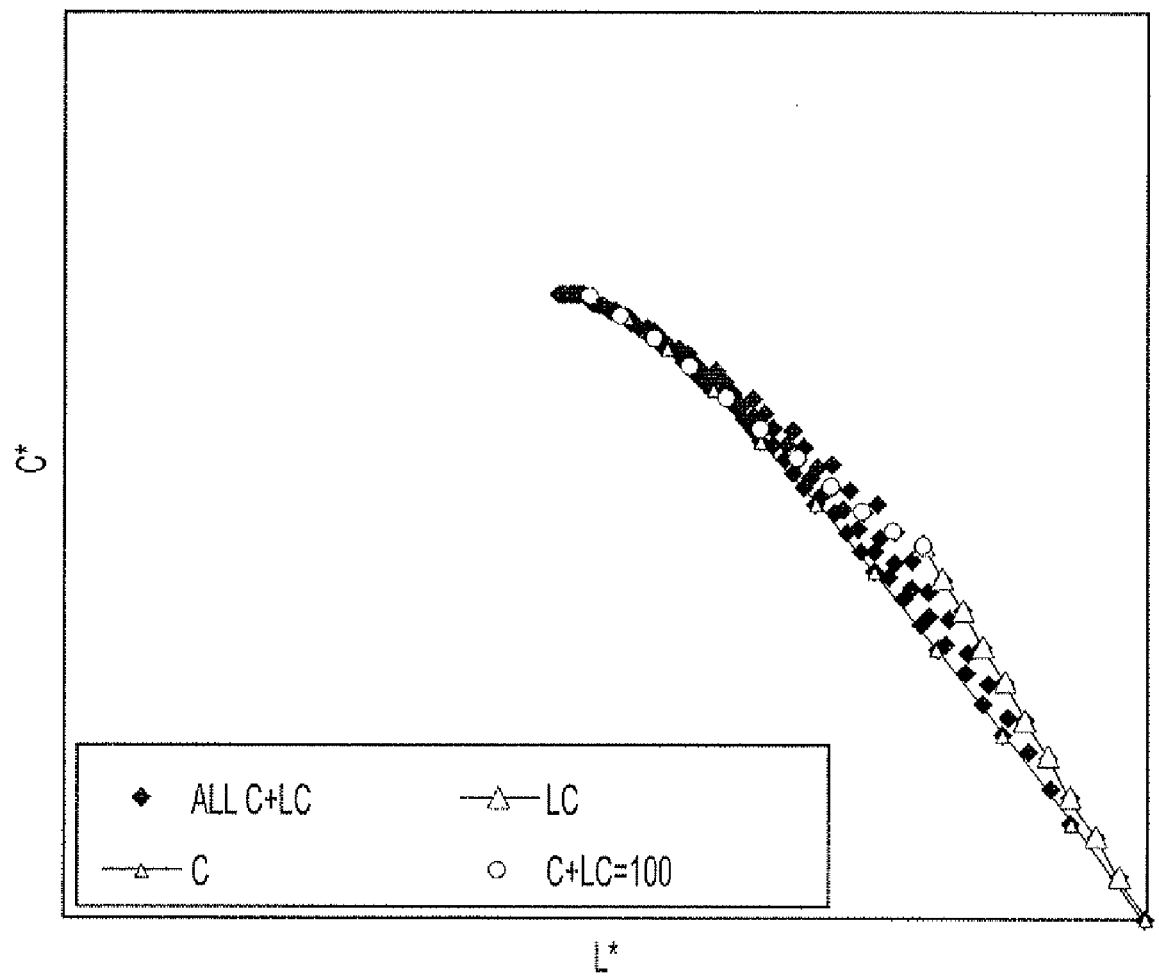
FIG. 2 is a graph of Chroma (C*) vs. Lightness (L*) illustrating the color difference between a light-cyan gel ink that is not hue corrected relative to the target halftone trajectory of the nominal cyan gel ink.

FIGS. 1 and 2 illustrate the hue shift and what happens to the color properties when the pigment loading is decreased to produce a light-cyan gel ink. FIG. 1, plotting b* vs. a*, shows over an ink mass per unit area range how far off the uncorrected light-cyan (LC curve) is from the target halftone trajectory of the nominal cyan gel ink (C curve). In this instance, the targeted color is defined as 40% area coverage point on the halftone trajectory of a nominal cyan UV ink. This difference in color is due to a color change upon decreasing the pigment loading resulting in shifting the hue angle while producing a significant deltaE color difference from the target curve, which is easily detected by the human eye. FIG. 2, plotting Chroma vs. Lightness, shows the corresponding difference between the uncorrected light-cyan gel ink (LC curve) compared to the target trajectory (C curve).

Example 4

Colorant A

The processes outlined in Examples 1-2 are carried out with modified colorant A. Colorant A comprises 0.25 wt % Pigment Blue 15:3 with 0.06 wt % Pigment Blue 61 as a hue adjusting colorant and 0.01 wt % R330 carbon black as a shade adjusting colorant. When the resultant gel ink is used in printing, the image does not have a significant hue shift.

Example 5

Colorant B

The processes outlined in Examples 1-2 are carried out with modified colorant B. Colorant B comprises 0.35 wt % Pigment Blue 15:3, with 0.03 wt % Pigment Red 122 and 0.03 wt % Pigment Red 269 as hue adjusting colorants, and 0.005 wt % R330 carbon black as a shade adjusting colorant. When the resultant gel ink is used in printing, the image does not have a significant hue shift.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A light-cyan radiation-curable gel ink, comprising:
   at least one curable monomer,
   at least one organic gellant,
   at least one photoinitiator, and
   a colorant, the colorant comprising:
      a cyan colorant,
      a hue-adjusting colorant that absorbs wavelengths of light from about 500 to about 600 nm, and
      an optional shade-adjusting colorant that absorbs wavelengths of light from about 400 to about 500 nm.

2. The ink of claim 1, further comprising the shade-adjusting colorant.

3. The ink of claim 1, wherein the cyan colorant absorbs wavelengths of light from about 600 to about 700 nm.

4. The ink of claim 1, wherein the cyan colorant comprises at least one colorant selected from the group consisting of Pigment Blue 15:3, Pigment Blue 15:4, Pigment Blue 16, Solvent Blue 35, Solvent Blue 38, Solvent Blue 48, Solvent Blue 70, and Solvent Blue 101.

5. The ink of claim 1, wherein the cyan colorant is present in an amount of from about 0.05% to about 6% by weight of the ink.

6. The ink of claim 1, wherein the hue-adjusting colorant comprises at least one colorant selected from the group consisting of Pigment Blue 61, Pigment Red 57:1, Pigment Red 81:2, Pigment Red 122, Pigment Red 184, Pigment Red 185, Pigment Red 238, Pigment Red 269, Solvent Red 49, Solvent Red 52, Solvent Red 151, Solvent Red 155, Solvent Red 172, Solvent Violet 13, Solvent Blue 97, Solvent Blue 102, Solvent Blue 104, and Solvent Blue 128.

7. The ink of claim 1, wherein the hue-adjusting colorant is present in an amount of from about 0.001% by weight to about 1% by weight of the ink.

8. The ink of claim 2, wherein the shade-adjusting colorant comprises at least one colorant selected from the group consisting of Pigment Yellow 12, Pigment Yellow 17, Pigment Yellow 74, Pigment Yellow 83, Pigment Yellow 97, Pigment Yellow 139, Pigment Yellow 155, Pigment Yellow 180, Pigment Orange 2, Pigment Orange 5, Pigment Orange 38, Pigment Orange 64, Pigment Red 4, Pigment Red 38, Pigment Red 66, Pigment Red 119, Pigment Red 178, Carbon Black, Solvent Yellow 16, Solvent Yellow 93, Solvent Yellow 104, Solvent Yellow 163, Solvent Yellow 141, Solvent Red 111, Solvent Black 7, Solvent Black 27, Solvent Black 45, and Cabot Mogul E black.

9. The ink of claim 2, wherein the shade-adjusting colorant is present in an amount of from about 0.001% by weight to about 0.6% by weight of the ink.

10. The ink of claim 1, wherein the light-cyan ink when printed at 100% halftone area coverage has substantially the same color as a nominal cyan ink when printed at one halftone area coverage of from about 15% to about 70% halftone area coverage.

11. A method of making a light-cyan radiation-curable gel ink, comprising:
  mixing at least one curable monomer, at least one organic gellant, at least one photoinitiator, and a colorant to form a mixture, the colorant comprising:
    a cyan colorant,
    a hue-adjusting colorant that absorbs wavelengths of light from about 500 to about 600 nm, and
    an optional shade-adjusting colorant that absorbs wavelengths of light from about 400 to about 500 nm; and
  heating the mixture; and
  cooling the heated mixture to form a gel ink.

12. The method of claim 11, wherein the colorant comprises the shade-adjusting colorant.

13. The method of claim 11, wherein the mixture is heated to at least the melting point of the ink vehicle.

14. The method of claim 11, wherein the light-cyan ink when printed at 100% halftone area coverage has substantially the same color as a nominal cyan ink when printed at one halftone area coverage of from about 15% to about 70% halftone area coverage.

15. A method of forming an image, comprising:
  printing with radiation-curable gel inks an image on a substrate,
  wherein:
    the radiation-curable gel inks comprise at least a cyan ink, a magenta ink, a yellow ink, and a light-cyan ink, and
    the light-cyan ink comprises at least one curable monomer, at least one organic gellant, at least one photoinitiator, and a colorant, the colorant comprising:
      a cyan colorant,
      a hue-adjusting colorant that absorbs wavelengths of light from about 500 to about 600 nm, and
      an optional shade-adjusting colorant that absorbs wavelengths of light from about 400 to about 500 nm.

16. The method of claim 15, wherein the colorant comprises the shade-adjusting colorant.

17. The method of claim 15, wherein the light-cyan ink when printed at 100% halftone area coverage has substantially the same color as the cyan ink when printed at one halftone area coverage of from about 15% to about 70% halftone area coverage.

* * * * *